May 1, 1923.

W. J. BEISEL

SPRING WHEEL

Filed July 26, 1921

Inventor
William J. Beisel,
By Watson, Coit, Morse & Grindle,
Attorney

May 1, 1923.
W. J. BEISEL
SPRING WHEEL
Filed July 26, 1921
1,453,541
2 Sheets-Sheet 2
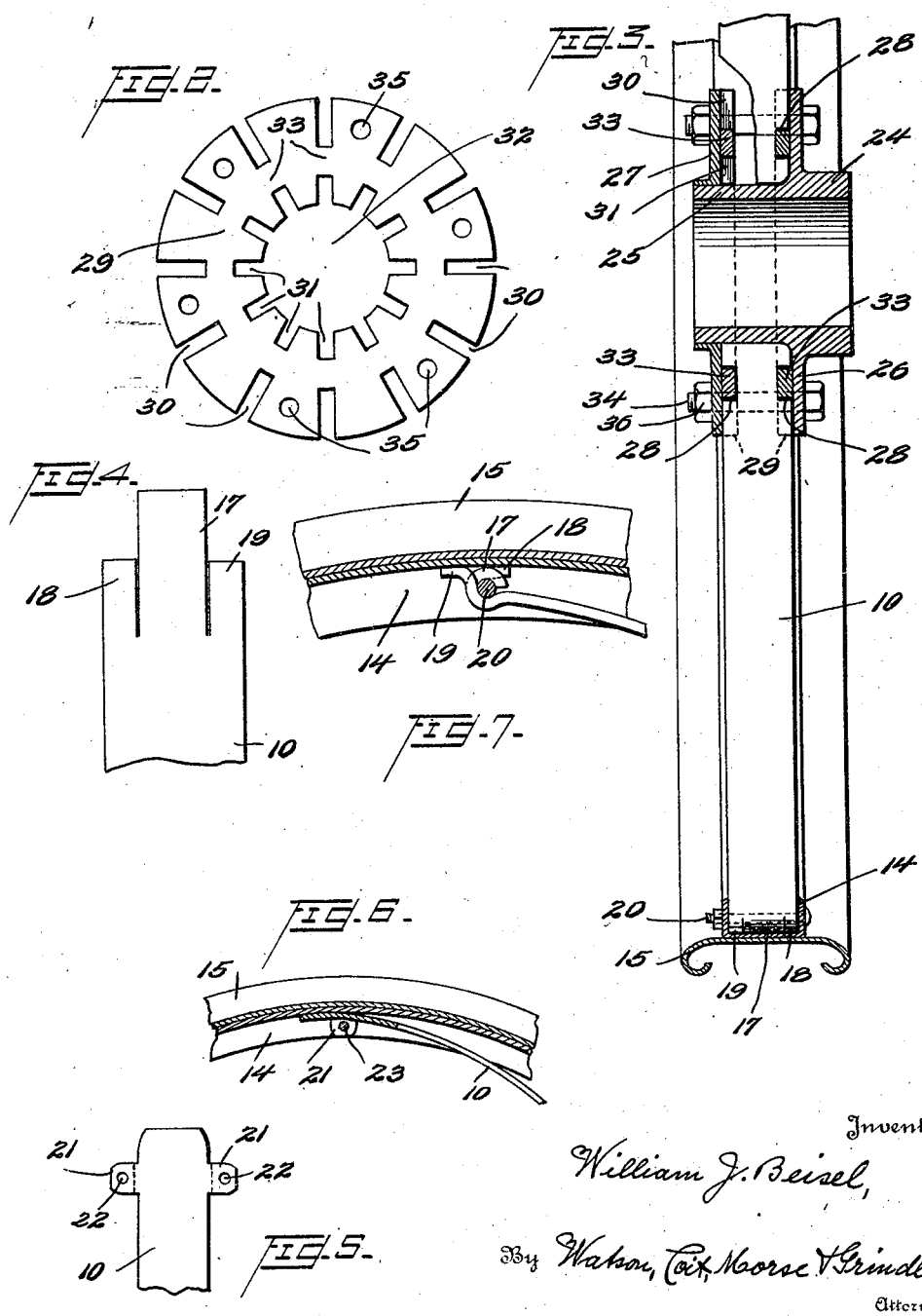

Patented May 1, 1923.

1,453,541

UNITED STATES PATENT OFFICE.

WILLIAM JAKOB BEISEL, OF PORT RICHMOND, NEW YORK.

SPRING WHEEL.

Application filed July 26, 1921. Serial No. 487,615.

*To all whom it may concern:*

Be it known that I, WILLIAM J. BEISEL, a citizen of the United States, residing at Port Richmond, county of Richmond, State of New York, have invented certain new and useful Improvements in Spring Wheels, of which the following is a specification.

This invention relates to spring wheels for vehicles and is particularly adapted for use on motor vehicles. It embodies a series of similar spokes made of flat spring metal curved between their ends in the plane of the wheel with their outer ends at the rim in planes almost tangent to the periphery, a novel rim structure and means for securing the ends of the spokes thereto and a novel hub structure. It is designed to produce a wheel which may be easily made and assembled, embodying only a few parts of simple structure but which will have all of the strength necessary to stand the strains of use, which will avoid undue wear on or disarrangement of the parts, thus prolonging the useful life of the wheel and which will have all of the yielding qualities desirable in a wheel. In addition to these advantages the rim and spoke structure may be applied to the hubs of automobile wheels which are now well known and in common use such as the Ford or other similar standard hub. This is accomplished by the structural arrangement of the inner ends of the spokes and two specially formed disks cooperating therewith and with the hub flanges. The novel features will be more fully understood from the following description and claims taken with the accompanying drawings. In the drawings:

Figure 2 is a side view of one of the hub disks detached.

Figure 3 is a partial vertical section on the line 3—3 of Figure 1, showing the hub structure particularly.

Figure 4 is face view of the blank form of the outer end of a spoke before it is bent to form.

Figure 5 is a similar view showing a modified form.

Figure 6 is a vertical sectional view of a part of the rim and the end of a spoke made from the blank of Figure 5 secured thereto, and Figure 7 is an enlarged sectional view showing the fastening means at the rim of the type illustrated in Figure 1.

Figure 1:
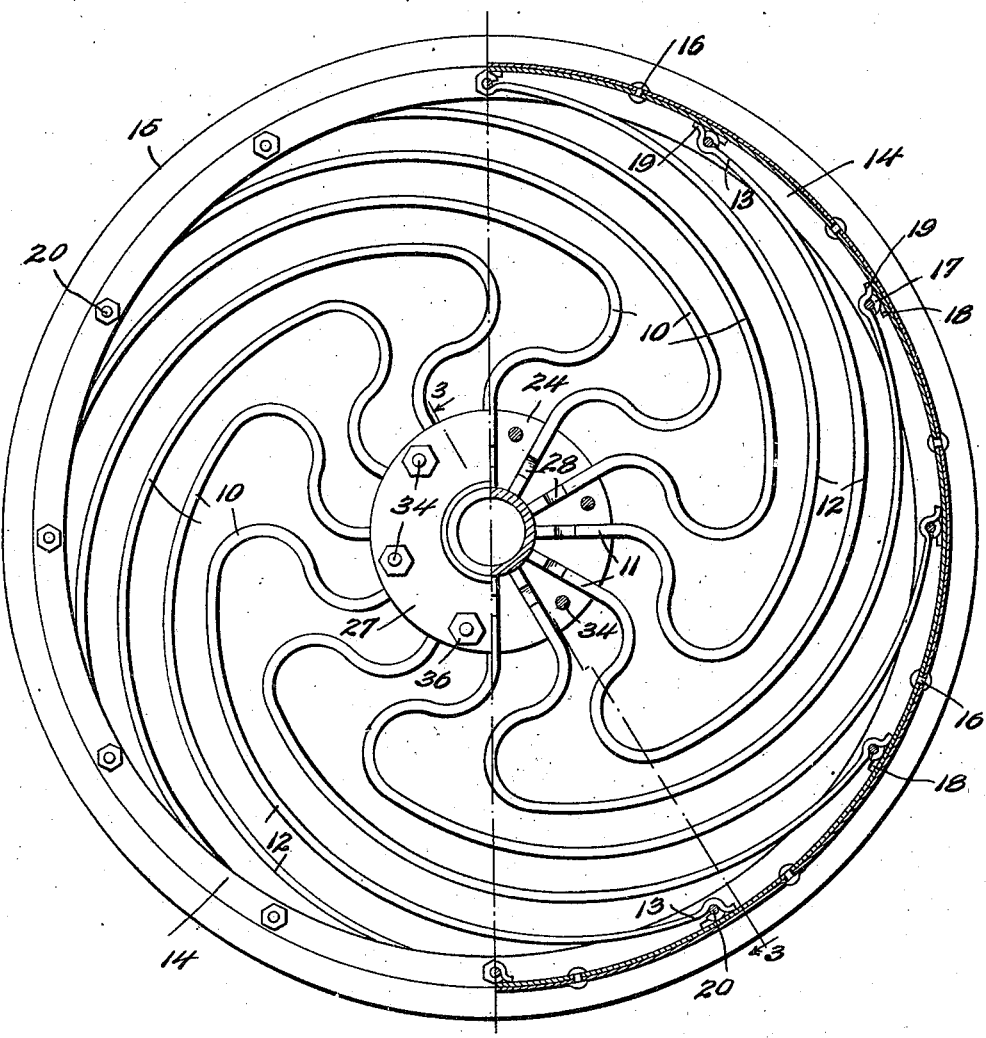
Figure 1 is a side view of a wheel embodying the invention partly in section.

In the form shown in the drawing the wheel embodies twelve spring spokes 10, each composed of a single strip of flat spring metal curved as shown between their ends in the plane of the wheel but it will be understood that the invention is not limited to any particular number of spokes or to the use of a single strip for each spoke. The inner ends 11 of the spokes are arranged radially and the radial part extends outwardly beyond the margins of the hub flanges and are there bent transversely of their flat surfaces in one direction and then outwardly and reversely forming the symmetrically curved portions 12 projecting on one side of the radial plane of the inner end. The outer end beyond this projection is on a curve of much larger radius which may gradually increase so that the extreme outer ends 13 are substantially or almost tangent to the rim. By this structure the bending strains under weight are transverse or at nearly right angles to the ends thus securing the necessary bending to produce all of the desired yielding.

The rim structure consists of an inner rim 14 in the form of a channel bar with the open side facing inwardly the channel being of such width as to receive the ends of the spokes between its side flanges and an outwardly facing rim 15 fitting the outer surface of the channel bar rim and adapted to receive a tire. The outer rim 15 is rigidly secured in place on the inner rim and for this purpose it may be riveted or welded at intervals as shown at 16. In the form shown the outer rim is of the clincher type but that is not essential.

As heretofore stated the outer ends of the spokes may be secured to the rim in two ways. In the form shown in Figure 1 the outer end is cut in the blank form shown in Figure 4 with the central projecting portion 17 of material width and the parallel side flanges 18 and 19 of less width and less length. The central portion 17 is bent to one side and then curled back on the arc of a circle forming a transverse cylindrical opening adapted to receive a pin 20 passing transversely through the side flanges of the channel bar rim 14 between their outer and inner edges. The flange 19 is given a similar bend but only for about half the circle and its outer end may then be given a slight reverse curve so that it will make contact with the inner surface of the base of channel bar rim 14 in advance of pin 20. The flange 18 is similarly curved for about three quarters of the circle and its end makes contact with the inner surface of the base of channel rim 14 at the rear of pin 20. These two yielding contacts on opposite sides of the pivot connection prevent looseness and resulting noise in operation.

In the other form of connection the outer end 13 of the spoke has integral laterally extending flaps or ears 21 as shown in Figure 5. These ears are bent to a position at right angles to the spoke end on the dotted lines in Figure 5 and are provided with corresponding holes 22 each to receive a pin 23 passing through the side flanges of the channel rim 14. In this instance the end of the spring may extend any distance desired beyond the pivot bearing on pin 23 and fits close against the inner surface of the base of the channel rim 14 and takes the pressure along that surface. This form also has an advantage over the first form in that the spoke could be made of more than one layer or leaf and both layers could pass the pivot pin and make supporting contact with the rim.

The hub shown consists of a metal member 24 having a cylindrical portion 25 adapted to fit the axle and an integral peripheral flange 26 near one end. A movable flange 27 fits around the cylindrical portion and may slide thereon towards the integral flange and the two flanges are of course parallel and of the same width. This structure will be found in standard hubs in common use on automobiles. In order to secure the inner ends of the spokes to this hub structure a rectangular notch 28 is formed on each side of each spoke near its inner end. Two metal disks 29 having a thickness approximately equal to the depth of notches 28 and a diameter equal to that of hub flanges have radial slots 30 cut therein from the outer margin corresponding in number, size and position to the spokes and have corresponding slots or notches 31 radiating from the inner circular opening 32, surround and may move along the cylindrical portion 25 of the hub which fits in said central openings. This leaves solid integral connecting portions 33 between the aligned ends of the two sets of slots and they have a length corresponding to that of the side notches 28 in the spokes so that the edge of a spoke may enter slots 30 and 31 while the connecting portions 33 enter their side notches 28. In assembling the parts on the hub one disk 29 is placed on the cylindrical portion 25 and moved to position close against integral flange 26. The spokes are then placed in position with their edges at one side entering the radial slots in the disk and the other disk 29 is then moved to position over the end of the cylindrical portion until the sides of the spokes facing it enter its slots. The movable hub flange 27 is then moved to position against the disk 29 and the edges of the spokes and bolts 34 having screw threaded ends are passed through corresponding openings in flanges 26 and 27 and openings 35 in disks 29 between adjacent spokes. Screw threaded nuts 36 are then applied to the screw threaded ends of the bolts to clamp the parts securely together in proper position. Instead of the procedure described both disks 29 may be first applied to the sides of the spokes and temporarily held there by suitable means and then the hub portion so moved as to make its cylindrical portion pass through them until flange 26 makes contact with them or the wheel structure may be moved to position on the hub. The position of disks 29 when the parts are assembled is shown in dotted lines in Figure 3. This produces a strong and lasting hub structure with a minimum of material in it. The wheel structure and hub disks have the advantage that they may be manufactured and sold separately from any hub ready to be applied to known hubs.

Although a specific embodiment of the invention is shown for purposes of illustration it will be understood that it is not limited to the specific form beyond what is indicated in the claims.

Having thus described my invention what is claimed as new and desired to be secured by Letters Patent is:

1. A spring wheel comprising in combination, a continuous channel bar rim facing inwardly, a series of flat metal spring spokes curved between their ends and having outer end portions extending along and close to the inner surface of the base of the channel bar rim between its side flanges, and pivot pins passing laterally through said side flanges and operatively connected to said spokes, the said end portions being spaced inwardly from the base of the channel bar rim to said pins but having extensions beyond the pivot pin making yielding contact with the inner face of the rim and reversely curved end portions extending from said pins making contact with said inner face of the rim in advance of said pins.

2. A spring wheel comprising in combination a continuous channel bar rim facing inwardly, a series of flat metal spring spokes curved between their ends and having outer ends extending along and close to the inner surface of the base of the channel bar rim between its side flanges, integral corresponding flaps or ears on opposite sides of each spoke a short distance from its ends extending inwardly from the edges of and at right angles to the spoke fitting between the side flanges of the channel bar rim and having corresponding openings therein, and bolts passing through said side flanges and through the openings in said flaps pivotally connecting the spokes to the rim with the end portion beyond said flaps in contact with the inner surface of the rim between the side flanges.

3. A spring wheel comprising in combination a continuous rim, a series of flat metal spring spokes connected to said rim at their outer ends, curved in the plane of the wheel between their ends and having inner ends in radial planes entering the hub structure and each having corresponding side notches in its edges near the inner end, a pair of disks having central circular openings and radial aligned slots in their inner and outer edges receiving and fitting the edges of the spokes and having intermediate connecting solid portions fitting in the notches in the spokes and serving to space the disks from each other, a hub having a cylindrical portion extending through the central openings in said disks and means for clamping the disks and spokes together on the cylindrical hub portion by pressure applied longitudinally of that portion.

4. A spring wheel comprising in combination a continuous rim, a series of flat metal spring spokes connected to said rim at their outer ends, curved in the plane of the wheel between their ends and having inner ends in radial planes entering the hub structure, a pair of metal disks at the side edges of the inner ends of said spokes, one on each side, having central openings and provided with surface portions so engaging surface portions of said spokes at their edges as to prevent relative movement of the engaged portions of the inner ends of the spokes and means for securing the disks and spoke ends together in assembled position, the spokes serving as the sole means separating the disks.

5. A spring wheel comprising in combination a continuous rim, a series of flat metal spring spokes connected to said rim at their outer ends, curved in the plane of the wheel between their ends and having inner ends in radial planes entering the hub structure and each having corresponding side notches in its edges near the inner end, a pair of disks having central circular openings and radial aligned slots in its inner and outer edges to receive the edges of the spokes and intermediate connecting solid portions adapted to enter the notches in the spokes the disks being spaced apart by the spokes only and means for securing the disks and inner ends of the spokes together in assembled relations.

6. In a vehicle wheel construction the combination with a rim of a series of spokes connected thereto having flat inner portions arranged in radial planes with their end surfaces on the lines of a cylinder and having side notches near their ends, a pair of circular disks having central circular openings corresponding to the circle on which the ends of the spokes terminate and having radial aligned slots entering from the inner and outer margins in which the edge portions of the spokes above and below the notches fit and having intermediate solid portions between the ends of the outer slots and corresponding inner slots fitting in the notches in the sides of the spokes the thickness of the disks being substantially equal to the depth of the notches in the spokes whereby the outer surfaces of the disks and the side surfaces of the spokes will be in substantially the same plane and the disks will be spaced apart solely by the spokes.

7. A spring wheel comprising in combination a continuous rim, a hub, a series of flat metal spring spokes having outer ends on a curve extending along and close to the inner face of the rim and pivotally connected thereto and inner ends on radial planes abutting the hub and means engaging said inner portions only at their side margins for clamping them rigidly in fixed position on said hub.

8. A vehicle wheel comprising a cylindrical hub including a peripheral flange near one end, a pair of similar thin circular disks having central openings in which the cylindrical portion of said hub slidably fits, a series of flat metal spokes having inner end portions abutting the cylindrical hub of uniform thickness arranged in radial planes passing through the axis of the hub, the said disks being at opposite sides of the inner end portions of said spokes on said cylindrical hub and having such surface engagement with the edge portions of the inner ends of said spokes as to prevent radial movement and rotative rotary movement thereof and adjustable means connecting said disks to said peripheral hub flange serving to clamp the radial inner ends of said spokes between said disks and to said peripheral flange.

9. A vehicle wheel comprising a series of similar flat metal spokes of much greater width than thickness having radial inner end portions provided with similar side notches in said portions, a pair of thin circular disks of uniform thickness having central circular openings and radial aligned slots in their inner and outer edges of substantially the same width as the thickness of the spokes in which the edges of the spokes on the inner and sides of their notches fit and intermediate solid portions between the ends of aligned slots entering and closely fitting in said side notches of said spokes one disk being on one side of the radial inner ends of said spokes and the other disk on the other side and means tending to force said disks together thus clamping the ends of the spokes between them.

10. A vehicle wheel comprising in combination a cylindrical hub portion, a series of spokes having flat inner end portions of uniform width arranged in radial planes with their end surfaces on the lines of a cylinder having the axis of the hub as its center and having side notches near their ends, a pair of circular disks with central openings slidably mounted on said cylindrical hub portion on opposite sides of the inner ends of the spokes and having aligned radial slots entering from the inner and outer margins in which the edges of the spokes above and below the notches fit and having intermediate solid portions between the outer and inner slots fitting in the notches in the sides of said spokes whereby said disks constitute the sole means for spacing the inner ends of the spokes and for preventing radial movement of them and means for securing the disks and inner ends of the spokes together in the relations stated.

In testimony whereof I hereunto affix my signature.

WILLIAM JAKOB BEISEL.